Feb. 7, 1967 J. RABINOW 3,303,483

MULTIBIT MAGNETIC HEAD STRUCTURE

Filed April 29, 1963

INVENTOR
Jacob Rabinow

BY Joseph A. Genovese & Mal L. Libman

ATTORNEYS

United States Patent Office 3,303,483

Patented Feb. 7, 1967

3,303,483

MULTIBIT MAGNETIC HEAD STRUCTURE

Jacob Rabinow, Bethesda, Md., assignor, by mesne assignments, to Control Data Corporation, Minneapolis, Minn., a corporation of Minnesota Filed Apr. 29, 1963, Ser. No. 276,359
1 Claim. (Cl. 340—174.1)

This invention relates to magnetic recording, and particularly to magnetic recording of codes.

In magnetic code recording the medium is usually moved with respect to the recording head, and the binary bits are recorded in such manner that the north and south poles of adjacent bits are "in-line" along the recording track, i.e., in a direction parallel to the motion of the magnetic medium. This applies to a multi-track system (where there is one head for each track, arranged transversely across the tape) as well as single-track recording. There are some instances where it is desirable to record, or at least have the capability of recording (or reading), a plurality of bits concurrently in a single track, with the bits reasonably densely packed i.e. of the order of 10 to 50 bits per inch.

To my knowledge, commercially available recording heads are from ¼ of an inch to ¾ of an inch in length (measured in the direction perpendicular to the gap and parallel to the track of the recording medium). Obviously, there can be only four of these (quarter inch) heads per inch, arranged in-line with the gaps transverse to the direction of motion of the recording medium. At best, the packing density that can be expected is four bits per inch.

An object of my invention is to provide a mult-sectional head which greatly increases the above packing density capability of magnetic recording where the bits defining a code are in a single track in such manner that the adjacent poles of adjacent bits are in a line parallel to the direction of motion of the medium.

Each section of my multi-sectional head is composed of a very thin substantially U shaped body made of highly permeable material, e.g. mu-metal, soft iron, various magnetic steels, etc., and a suitable coil wrapped around the short member of the U in such a manner that it does not increase the head-length (dimension of the head section measured parallel to the motion of the recording medium). I have had head sections constructed in this manner i.e. with the body of the section made of very thin sides, where the critical length dimension is only 0.03 inch, and there is no reason why the head sections cannot be constructed considerably thinner by using a similar head-section configuration. Thus, my head has the capability of recording many more bits per inch simultaneously with the north and south poles arranged in-line in a single track in a direction parallel to the motion of the recording medium (or head).

I have indicated that my head provides the capability of concurrently recording bits with reasonable packing density in a single track. However, it is understood that even though the capability of concurrent recording is made available, my head can be used in other modes, for instance the head (or medium) can be indexed to successive character positions (or one or the other can be in continuous motion) and the code signals impressed on successive head sections. In other words, the essence of my invention is to provide a magnetic head capable of comparatively dense in-line recording. It does not matter whether the remainder of the recording system, which forms no part of my invention, proivdes the record pulses serially or concurrently to the sections of my head.

I am aware of the usual recording techniques for computer or computer-like usage. Ordinarily the recording medium has a number of tracks and there is a corresponding number of heads with one associated with each track. All of the bits defining a single character are recorded (or read) concurrently i.e. one bit in each track. This automatically avoids the problem of having more than one head in a single track and the accompanying difficulty of placing the heads (in a single track) with the gaps closer than approximately ¼ of an inch. But there are instances where it is not practical and sometimes not possible to use multi-track recording. Two are shown herein, i.e. where the recording medium is on the face of postal articles such as envelopes, and the available space (without obliterating the addressee, return address, etc.) is too small for more than one, or possibly two or three tracks. Another is where the input signal defining a code is received at high speed and the geometry of the recording medium makes it very difficult to use the multi-track system. U.S. Patent No. 3,196,450 describes examples of the desirability of recording a group of signals concurrently in a format wherein the bits are in-line lengthwise of the record track and are recorded with a packing density which is reasonable for the application.

Another application of my invention is in connection with a recording system used as a delay line. For example where data is to be delayed (or stored), and the data is made available (either serially or in parallel) it is often advantageous to record (or read) the code bits serially in a single track with reasonable packing density.

Accordingly, an object of my invention is to provide improvements in code recording systems where the bits are recorded in-line, i.e. with adjacent poles of adjacent bits in a line parallel to the direction of motion of the medium. Improvements are obtained by a multi-section head with the sections much closer together than is possible with the presently available magnetic heads. Thus, I can record with a much greater packing density than is presently possible with commercially available heads used in a manner similar to my multi-section head.

Other objects and features of importance will become apparent in following the description of the illustrated form of the invention.

Figure 1:
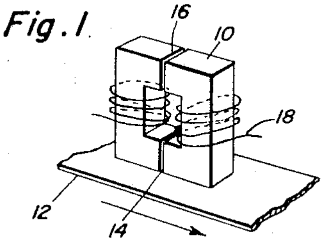
FIGURE 1 is a perspective view of a commercially available magnetic head.
Figure 3:
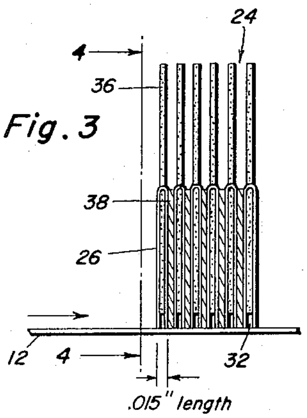
FIGURE 3 is a sectional view of my multi-section head taken on the line 3—3 of FIGURE 4.
Figure 4:
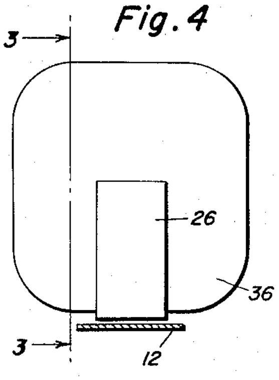
FIGURE 4 is a view taken on line 4—4 of FIGURE 3.
Figure 2:
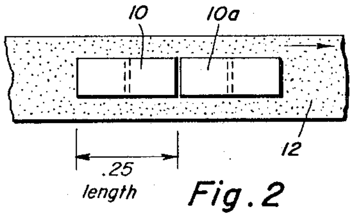
FIGURE 2 is a top view showing two of the heads of FIGURE 1 arranged in line in a single track.

FIGURES 1 and 2 show commercially available, magnetic record and/or read heads 10 and 10*a* being used with a magnetic medium 12. Head 10 (FIGURE 1) is made of a magnetic, e.g. soft iron, body provided with a recording gap 14, a back gap 16 and one or more windings 18. The length of the head (measured in a direction parallel to relative motion between the medium and head) is ordinarily of the order of one quarter to three quarters of an inch. For recording in-line (FIGURE 9), i.e. with the adjacent poles of adjacent bits formed in a line parallel to the direction of recording motion (of the medium and/or head), no problems are encountered in using one head for each track. But (FIGURE 2) if one desires to have the capability of concurrently recording or reading a plurality of bits in-line (as in FIGURE 9), packing density suffers greatly. Physically, conventional heads cannot be placed closer than about one quarter of an inch measured between recording gaps (see FIGURE 2).

I realize that when codes are recorded in-line in a single track (FIGURE 9), only one head is generally used, and the medium is ordinarily moved with respect to the single head. As will be seen later, there are some cases where it is more advantageous to have the capability to concurrently record (or read) a plurality of bits in-line in a single track. I am also familiar with the usual multi-track systems where all of the bits defining a character are simultaneously recorded in several tracks (usually five to eight) by means of separate heads. Again, this recording mode is not possible, or not desirable, in some cases.

Figure 7:
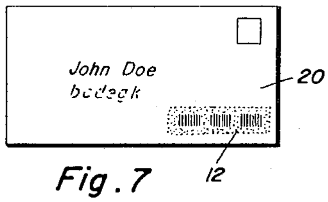
FIGURE 7 is a front view showing one application where only one or two magnetic tracks are admissible, and showing one of the many possible uses of my head structure.

Some of the applications where concurrent recording and/or reading a plurality of bits in-line (FIGURE 9), but with a higher packing density (FIGURE 2) than is possible with conventional heads, are as follows. FIGURE 7 shows a postal article 20 such as an envelope or package where there is insufficient room for more than one or possibly two or three tracks. This also applies to non-postal articles such as for in-plant sorting of envelopes, packets, or articles of manufacture. Bank drafts, money orders and other documents are other examples.

Figure 8:
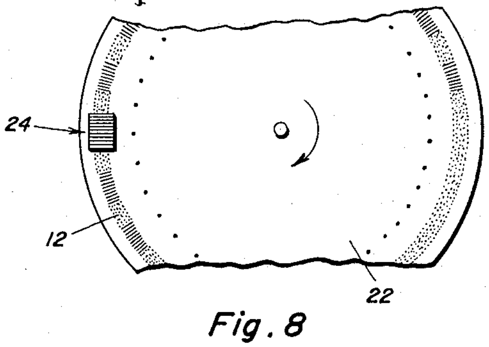
FIGURE 8 is a fragmentary front view of a scanning disc used as a magnetic memory device, and showing another application of my invention.

Another class of examples is shown in FIGURE 8. Scanning disc 22 is provided with magnetic track 12 which can be used for many purposes, e.g. the short term storage device of a reading machine, or the character-criteria thereof. Owing to high disc speeds and the lack of space, recording and/or reading of bits concurrently in a single track is advantageous.

Figure 5:
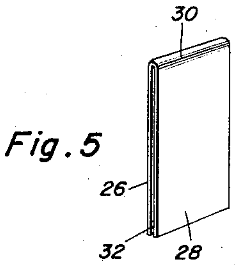
FIGURE 5 is a perspective view of the magnetic structure of one section of the head structure of FIGURE 3.
Figure 9:
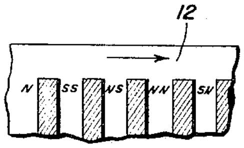
FIGURE 9 is a greatly enlarged schematic view showing the arrangement of bits of in-line code recording.

I have devised a multi-sectional head structure 24 (FIGURES 3–8) which provides the capability of concurrently recording (and/or reading) a plurality of bits in-line as defined before and as shown in FIGURES 7–9. Head structure 24 is made of a plurality of identical head sections, each having a very small length dimension, for instance of the order of 0.010 to 0.030 inch. Each head section is composed of a U shaped body (FIGURE 5) of permeable material e.g. mu-metal, having thin, flat, parallel sides 26, 28 connected as at 30 at one pair of ends and spaced at the opposite pair of ends to define a flux gap 32. A flat coil or other suitable winding 36 is located partially between sides 26, 28 above them and laterally thereof in a manner that the length dimension of the head section is not increased because of the winding. Magnetic-pulse shielding, for instance copper sheet 38, is disposed between adjacent head sections; and the entire head structure is potted in epoxy resin or other suitable potting substance (not shown).

Figure 6:
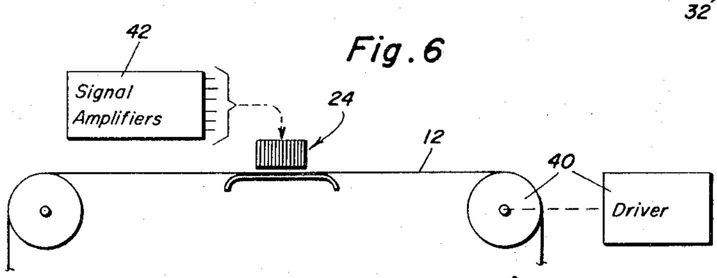
FIGURE 6 is a schematic view showing my head structure in use.

Head structure 24 can be used for the purposes mentioned in U.S. Patent No. 3,196,450, while FIGURES 6 and 8 show other applications. FIGURE 6 shows the medium 12 as a tape driven by transport 40. Head structure 24 is stationary at a record-read station. It is electrically driven by amplifiers 42, there being one amplifier for each head section. FIGURE 8 shows head section 24 superposed with respect to the magnetic track of disc 22.

It is understood that various modifications may be made without departing from the protection of the following claim.

I claim:

A multi-section magnetic head capable of simultaneously recording a plurality of discrete bits closely adjacent to each other lengthwise of a magnetic track, said head having a plurality of discrete head sections each of which is capable of recording a binary bit simultaneously with and independently of the other head sections, each section comprising a U shaped core made of magnetic material and having a pair of flat elongate sides closely spaced and parallel throughout their lengths, and a transverse connecting member at one pair of ends of said sides, the other pair of ends of said sides being spaced a distance of no more than 0.1 inch to form a flux gap of the same dimension, a flat winding on each core to accept energizing signals, each winding disposed around the connecting member of its core and partially disposed in the space between its confronting sides and partially in the space between the projected planes of said sides, a portion of said winding occupying more than 50% of the space between said flat sides of its core, and a thin non-magnetic shield between the confronting sides of adjacent cores of each head section to magnetically isolate each head section, the shield between adjacent cores being flat and parallel to the longer dimensions of the gaps of said discrete head sections.

References Cited by the Examiner

UNITED STATES PATENTS

| | | | |
|---|---|---|---|
| 2,868,889 | 1/1959 | Patterson | 179—100.2 |
| 3,192,608 | 7/1965 | Rinia et al. | 340—174.1 |
| 3,196,450 | 7/1965 | Chapin | 340—174.1 |

BERNARD KONICK, *Primary Examiner.*

A. BERNARD, A. I. NEUSTADT, *Assistant Examiners.*